United States Patent
Shimakura et al.

(10) Patent No.: US 10,283,961 B2
(45) Date of Patent: May 7, 2019

(54) VOLTAGE AND REACTIVE POWER CONTROL SYSTEM

(71) Applicant: Hitachi, Ltd., Chiyoda-ku, Tokyo (JP)

(72) Inventors: Satoshi Shimakura, Tokyo (JP); Yoshikazu Ishii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 338 days.

(21) Appl. No.: 15/182,670

(22) Filed: Jun. 15, 2016

(65) Prior Publication Data
US 2017/0063089 A1 Mar. 2, 2017

(30) Foreign Application Priority Data
Aug. 28, 2015 (JP) .................. 2015-168447

(51) Int. Cl.
*G05D 3/12* (2006.01)
*G05D 5/00* (2006.01)
(Continued)

(52) U.S. Cl.
CPC .............. *H02J 3/16* (2013.01); *G05B 13/026* (2013.01); *G06N 7/005* (2013.01);
(Continued)

(58) Field of Classification Search
CPC .. H02J 3/16; Y02E 40/34; Y02E 40/74; Y02E 40/76; Y04S 10/22; Y04S 10/24
(Continued)

(56) References Cited

U.S. PATENT DOCUMENTS

| 10,090,704 B2 | 10/2018 | Inuzuka et al. |
| 2010/0094474 A1* | 4/2010 | Larsen ............ H02J 3/16 700/287 |

(Continued)

FOREIGN PATENT DOCUMENTS

| JP | 2004-29869 A | 1/2004 |
| JP | 2005-57821 A | 3/2005 |

(Continued)

OTHER PUBLICATIONS

English translation of Japanese Office Action issued in counterpart Japanese Application No. 2015-168447 dated Nov. 12, 2018 (three (3) pages).

*Primary Examiner* — Mohammad Ali
*Assistant Examiner* — Md Azad
(74) *Attorney, Agent, or Firm* — Crowell & Moring LLP

(57) ABSTRACT

An object of the invention is to economically operate a voltage reactive power control device by reducing a transmission loss and reducing the number of tapping operations affecting the life span of a facility. Provided is a voltage reactive power control device including a central monitoring device that includes a loss prediction information output unit calculating a bus voltage on the basis of a generation probability of a power generation pattern, and outputting loss prediction information associated with the bus voltage from system configuration information, and includes a control amount determination unit determining a control pattern of the voltage reactive power control device from the loss prediction information. According to the invention, it is possible to economically operate a voltage reactive power control device by reducing a transmission loss and reducing the number of tapping operations affecting the life span of a facility.

4 Claims, 23 Drawing Sheets

(51) Int. Cl.
*G05D 9/00* (2006.01)
*G05D 11/00* (2006.01)
*G05D 17/00* (2006.01)
*H02J 3/16* (2006.01)
*G05B 13/02* (2006.01)
*G06N 7/00* (2006.01)
*H02J 13/00* (2006.01)

(52) U.S. Cl.
CPC ........... *H02J 13/0006* (2013.01); *Y02E 40/34* (2013.01); *Y02E 40/74* (2013.01); *Y02E 40/76* (2013.01); *Y02E 60/726* (2013.01); *Y04S 10/22* (2013.01); *Y04S 10/24* (2013.01); *Y04S 10/545* (2013.01)

(58) Field of Classification Search
USPC ........................................................ 700/287
See application file for complete search history.

(56) References Cited

U.S. PATENT DOCUMENTS

| | | | |
|---|---|---|---|
| 2013/0134779 A1* | 5/2013 | Watanabe | G05F 1/70 307/24 |
| 2014/0008975 A1 | 1/2014 | Forseth | |
| 2016/0172857 A1* | 6/2016 | Itaya | H02J 3/16 700/298 |
| 2016/0204614 A1* | 7/2016 | Itaya | H02J 3/14 307/82 |

FOREIGN PATENT DOCUMENTS

| | | | | |
|---|---|---|---|---|
| JP | 2013-005621 A | * | 1/2013 | ............... H02J 3/16 |
| JP | 2013-5621 A | | 1/2013 | |
| JP | 2014-225947 A | | 12/2014 | |
| WO | WO 2013/124973 A1 | | 8/2013 | |
| WO | WO 2014/207849 A1 | | 12/2014 | |

* cited by examiner

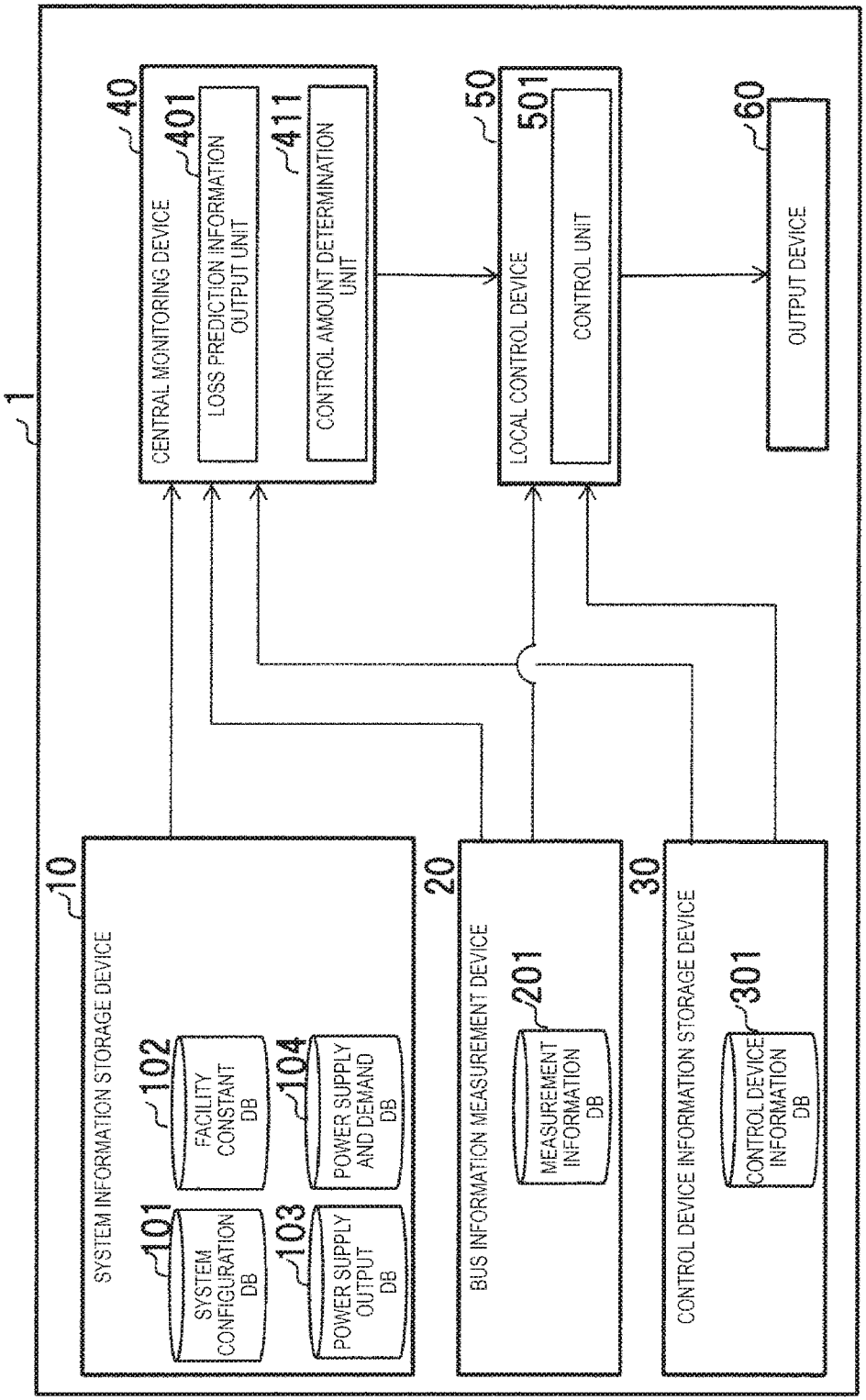
[Fig. 1]

[Fig. 2]

CURRENT POWER GENERATION, DEMAND INFORMATION

| DEMAND | DEMAND AREA | DEMAND AREA A | DEMAND AREA B | ... |
|---|---|---|---|---|
| | POWER DEMAND [MW] | 100 | 200 | ... |
| POWER GENERATION | POWER PLANT | WIND POWER PLANT A | THERMOELECTRIC POWER PLANT B | ... |
| | POWER SUPPLY OUTPUT [MW] | 10 | 150 | ... |

PREDICTED INFORMATION OF OUTPUT FLUCTUATION

| TYPE OF POWER SUPPLY | WIND POWER PLANT | | | | | | | |
|---|---|---|---|---|---|---|---|---|
| NAME OF POWER SUPPLY | WIND POWER PLANT A | | | | | | | |
| POSITION OF POWER SUPPLY | AREA A | | | | | | | |
| CAPACITY | 10 [MW] | | | | | | | |
| POWER SUPPLY OUTPUT [MW] | | | | | | | | |
| PROBABILITY DISTRIBUTION OF OUTPUT FLUCTUATION RANGE | PREDICTED TIME STEP | OUTPUT FLUCTUATION RANGE [MW] | ... | -2 | -1 | 0 | 1 | 2 | ... |
| | AFTER 10 SECONDS | PROBABILITY [%] | ... | 0 | 0 | 60 | 30 | 10 | ... |
| | AFTER 20 SECONDS | | ... | 0 | 0 | 50 | 25 | 25 | ... |
| | ... | | ... | ... | ... | ... | ... | ... | ... |

[Fig. 3]
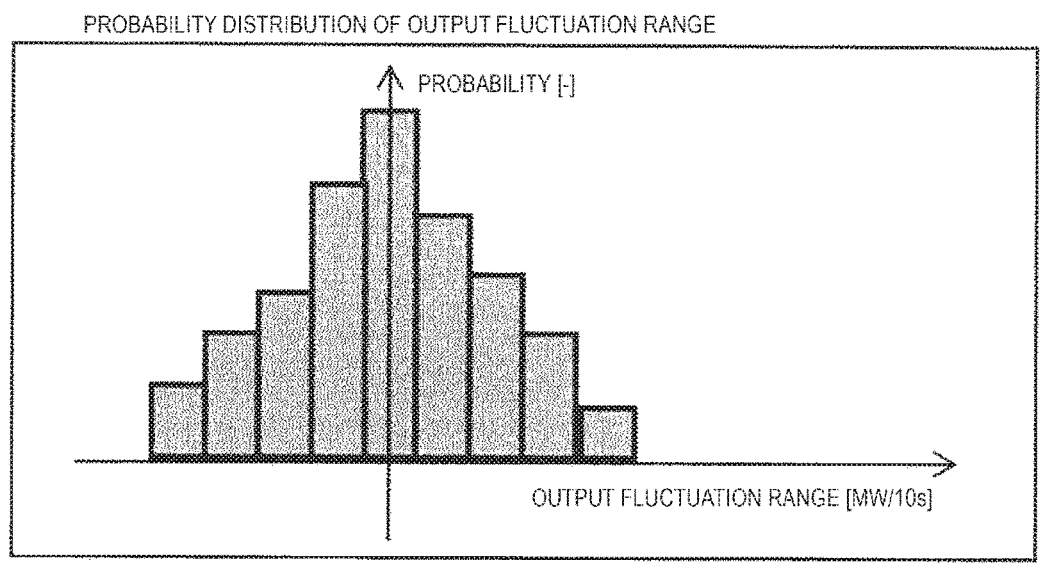

[Fig. 4]

CURRENT POWER GENERATION, DEMAND INFORMATION

| | POWER PLANT | WIND POWER PLANT A | THERMOELECTRIC POWER PLANT B | ... |
|---|---|---|---|---|
| POWER GENERATION | POWER SUPPLY OUTPUT [MW] | 10 | 150 | ... |
| DEMAND | DEMAND AREA | DEMAND AREA A | DEMAND AREA B | ... |
| | POWER DEMAND [MW] | 100 | 200 | ... |

[Fig. 5]
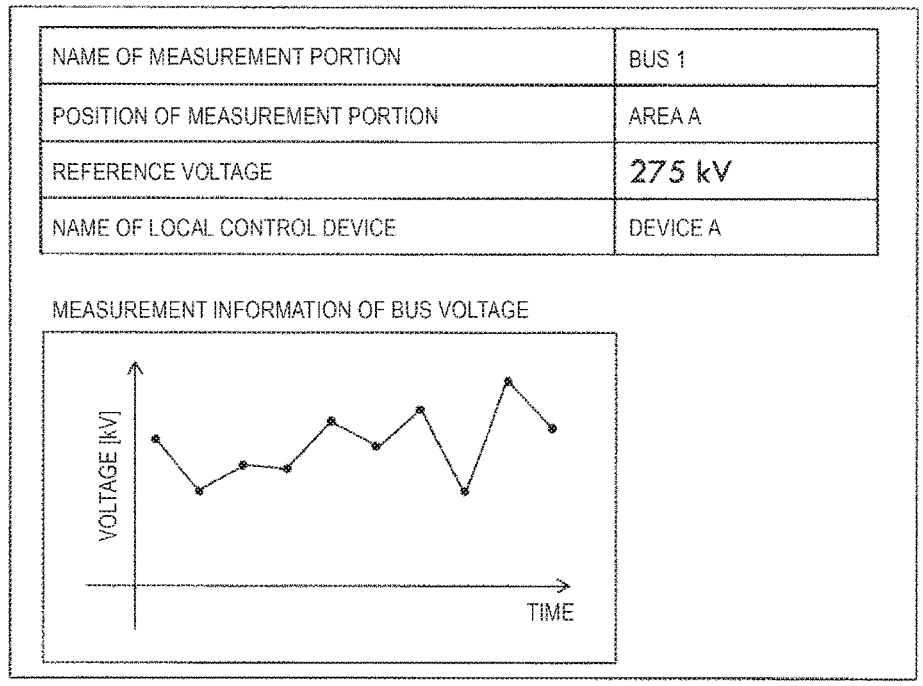
[Fig. 6]

[Fig. 7]

| NAME OF LOCAL CONTROL DEVICE | | | DEVICE A | | | |
|---|---|---|---|---|---|---|
| DEVICE TO BE CONTROLLED | PHASE ADJUSTMENT FACILITY | NAME | CAPACITY(MVar) | CONTROL COST | | |
| | | POWER CAPACITOR 1 | 20 | ◇◇ | | |
| | | SHUNT REACTOR 2 | 20 | ... | | |
| | | ... | ... | ... | | |
| | TRANSFORMER WITH LTC | NAME | REFERENCE VOLTAGE | TAPPING POINT | TRANSFORMATION RATIO | CONTROL COST |
| | | | PRIMARY-SIDE / SECONDARY-SIDE | | TAPPING POSITION:1 | |
| | | TRANSFORMER 3 | 275kV / 66kV | 10 POINTS | □□ / ... | △△ |
| | | ... | ... / ... | ... | ... / ... | ... |
| | | ... | ... / ... | ... | ... / ... | ... |
| | ... | | | | | |

[Fig. 8]
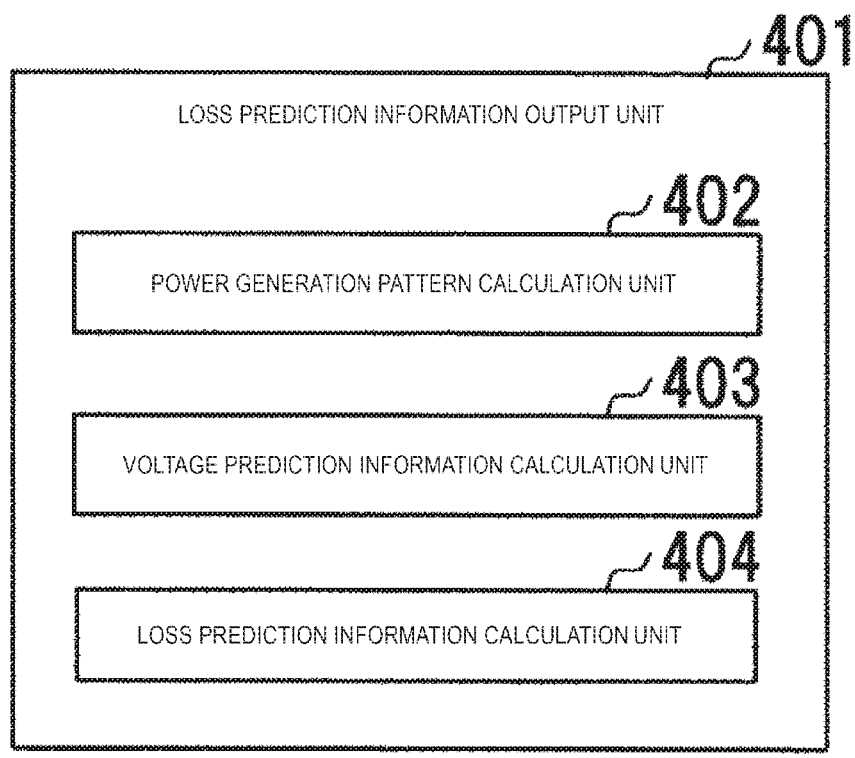

[Fig. 9]
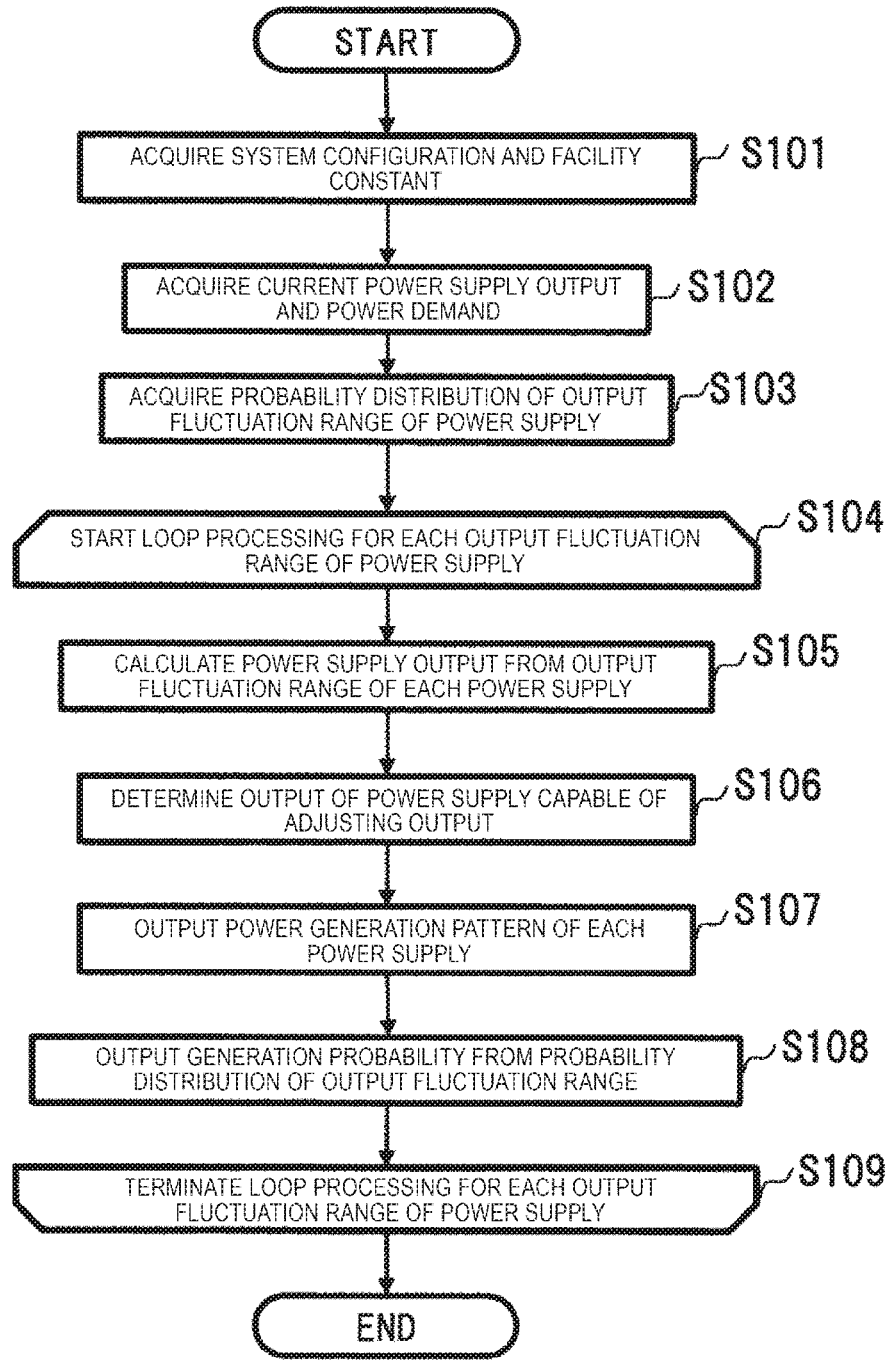

[Fig. 10]

[CURRENT]

| DEMAND | DEMAND AREA | DEMAND AREA A | DEMAND AREA B | ... |
| --- | --- | --- | --- | --- |
| | POWER DEMAND [MW] | 100 | 200 | ... |
| POWER GENERATION | POWER PLANT | WIND POWER PLANT A | THERMOELECTRIC POWER PLANT B | ... |
| | POWER SUPPLY OUTPUT [MW] | 10 | 150 | ... |

[OUTPUT PREDICTION]

| POWER GENERATION PATTERN | | POWER GENERATION PATTERN 1 | | POWER GENERATION PATTERN 2 | | |
| --- | --- | --- | --- | --- | --- | --- |
| POWER PLANT | | WIND POWER PLANT A | THERMOELECTRIC POWER PLANT B | ... | WIND POWER PLANT A | ... |
| POWER SUPPLY OUTPUT [MW] | AFTER 10 SECONDS | 5 | 140 | ... | 12 | ... |
| | AFTER 20 SECONDS | ... | ... | | ... | ... |
| GENERATION PROBABILITY | PREDICTED TIME STEP | 0.5% | | | 0.3% | |
| | | ... | ... | | ... | ... |

[Fig. 11]
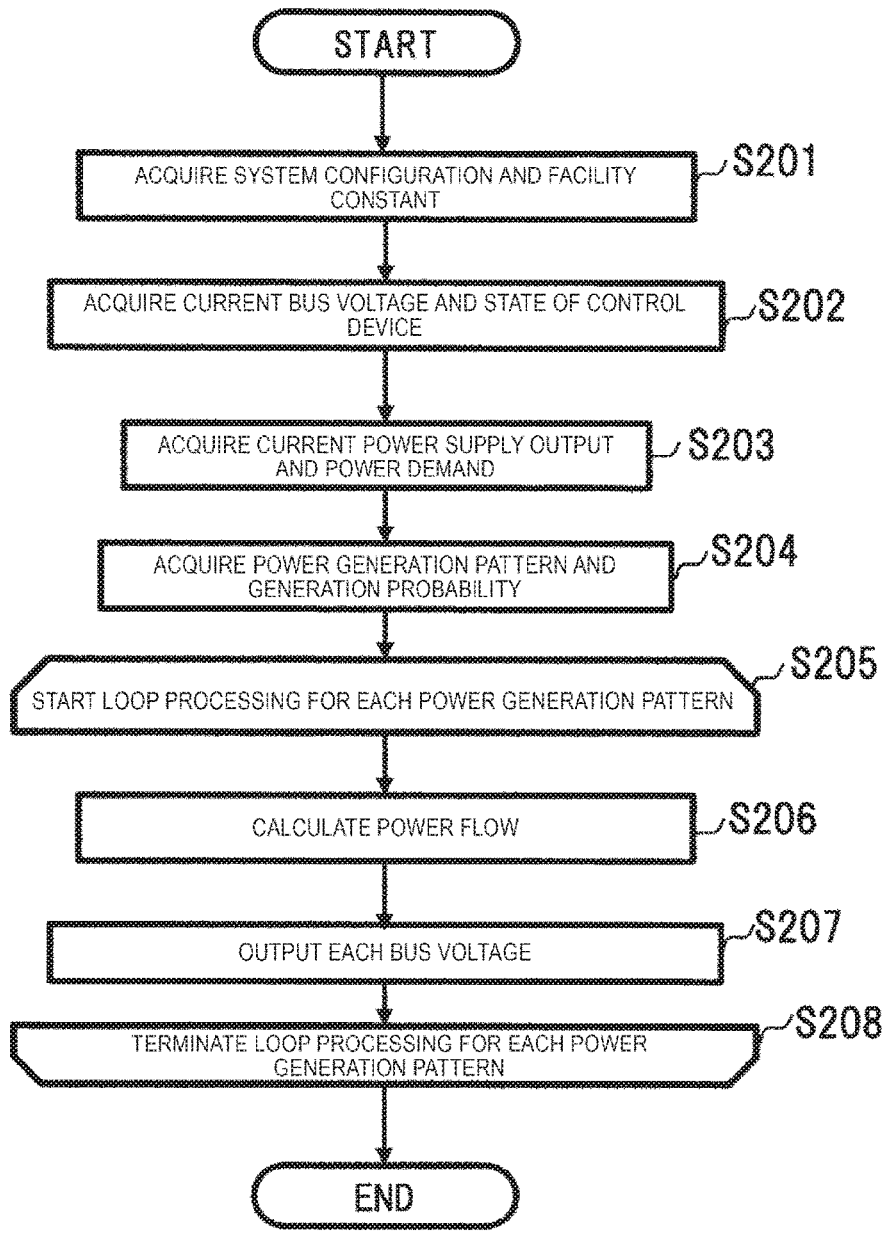

[Fig. 12]

| CURRENT POWER FLOW | BUS | BUS 1 | BUS 2 | ... | | |
|---|---|---|---|---|---|---|
| | VOLTAGE [kV] | 274 | 278 | ... | | |
| POWER GENERATION PATTERN | | POWER GENERATION PATTERN 1 | | | POWER GENERATION PATTERN 2 | |
| PREDICTED POWER FLOW | BUS | BUS 1 | BUS 2 | ... | ... | ... |
| | VOLTAGE [kV] | 273.5 | 278.7 | ... | ... | ... |
| | VOLTAGE FLUCTUATION [kV] | -0.5 | +0.7 | ... | ... | ... |
| GENERATION PROBABILITY | PREDICTED TIME STEP | AFTER 10 SECONDS | 0.5% | | 0.3% | ... |
| | | ... | ... | | ... | ... |

[Fig. 13]
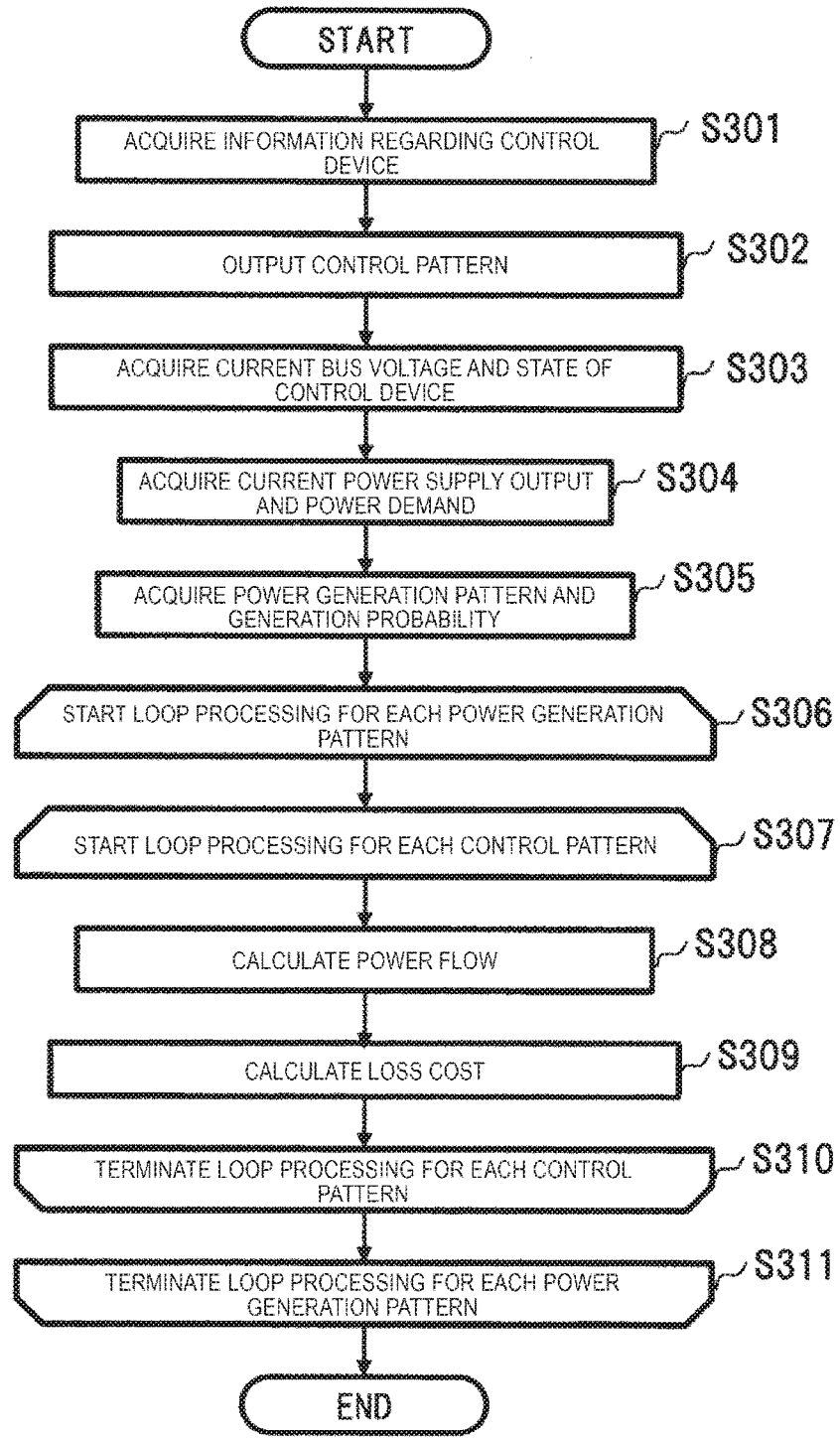

[Fig. 14]

| | CONTROL PATTERN | | INITIAL STATE | CONTROL PATTERN 1 | CONTROL PATTERN 2 | ... |
|---|---|---|---|---|---|---|
| | TOTAL CONTROL COST [¥] | | ●● | ◇◇ | ... | ... |
| DEVICE TO BE CONTROLLED | PHASE ADJUSTMENT FACILITY | NAME | TURN-ON/TURN-OFF | | | |
| | | POWER CAPACITOR 1 | TURN-ON | TURN-ON | ... | ... |
| | | SHUNT REACTOR 2 | TURN-OFF | TURN-OFF | ... | ... |
| | | ... | ... | ... | ... | ... |
| | TRANSFORMER WITH LTC | NAME | TAPPING POSITION | | | |
| | | TRANSFORMER 3 | 1 | 2 | ... | ... |
| | | ... | ... | ... | ... | ... |
| | ... | ... | ... | ... | ... | ... |

[Fig. 15]

| POWER GENERATION PATTERN | | | POWER GENERATION PATTERN 1 | | POWER GENERATION PATTERN 2 | | ... |
|---|---|---|---|---|---|---|---|
| PREDICTED POWER FLOW (WITHOUT CONTROL) | | LOSS COST [¥] | ○○ | | ... | | ... |
| | | BUS | BUS 1 | BUS 2 | ... | ... | ... |
| | | VOLTAGE [kV] | 273.5 | 278.7 | ... | ... | ... |
| | | VOLTAGE FLUCTUATION [kV] | -0.5 | +0.7 | ... | ... | ... |
| CONTROL PATTERN | CONTROL PATTERN 1 | LOSS COST [¥] | △△ | | ... | | ... |
| | | BUS | BUS 1 | BUS 2 | ... | ... | ... |
| | | VOLTAGE [kV] | 274.0 | 278.3 | ... | ... | ... |
| | | VOLTAGE FLUCTUATION [kV] | 0 | +0.3 | ... | ... | ... |
| | ... | ... | ... | ... | ... | ... | ... |

[Fig. 16]

| | | POWER GENERATION PATTERN | POWER GENERATION PATTERN 1 | POWER GENERATION PATTERN 2 | ... |
|---|---|---|---|---|---|
| PREDICTED TIME STEP | AFTER 10 SECONDS | GENERATION PROBABILITY | 0.5% | 0.3% | ... |
| | | LOSS COST — WITHOUT CONTROL | ○○ | ... | ... |
| | | LOSS COST — CONTROL PATTERN 1 | △△ | ... | ... |
| | | ... | ... | ... | ... |
| | AFTER 20 SECONDS | GENERATION PROBABILITY | ... | ... | ... |
| | | LOSS COST — WITHOUT CONTROL | ... | ... | ... |
| | | LOSS COST — CONTROL PATTERN 1 | ... | ... | ... |
| | | ... | ... | ... | ... |
| | ... | ... | ... | ... | ... |

[Fig. 17]
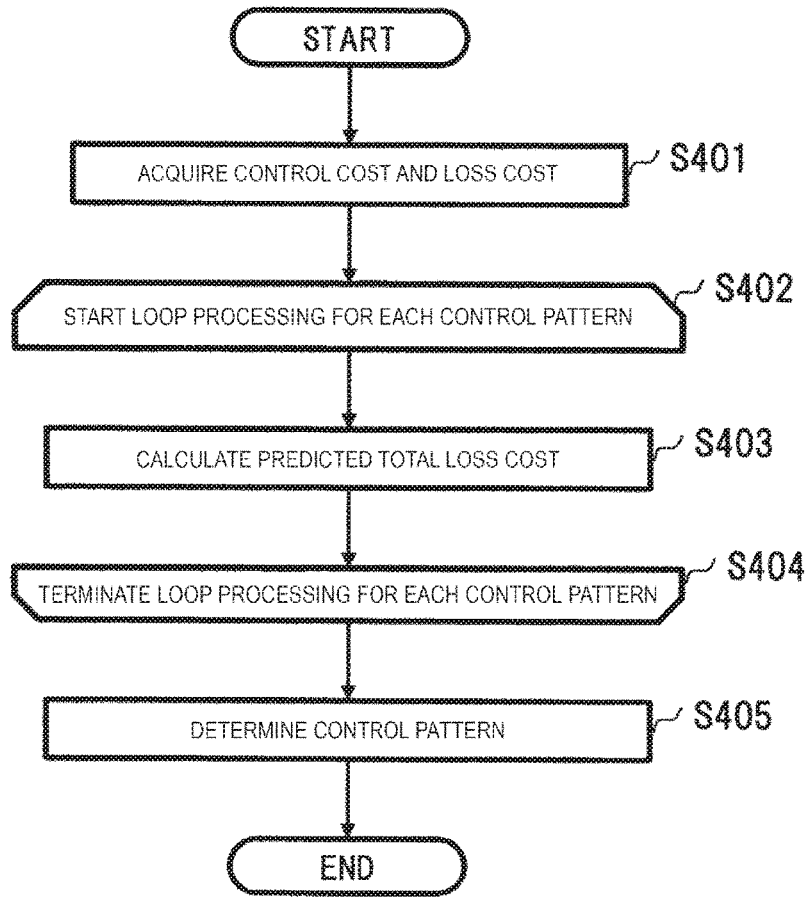
[Fig. 18]
| CONTROL PATTERN | WITHOUT CONTROL | CONTROL PATTERN 1 | CONTROL PATTERN 2 | ... |
|---|---|---|---|---|
| TOTAL CONTROL COST [¥] | ●● | ◇◇ | ... | ... |
| PREDICTED TOTAL LOSS [¥] (FOR ONE MINUTE) | ○○ | ... | ... | ... |

[Fig. 19]

NAME OF LOCAL CONTROL DEVICE: DEVICE A

CONTROL TIME

1/1/2015 00:00

BUS VOLTAGE BEFORE CONTROL

| BUS | BUS 1 | BUS 2 | ... |
|---|---|---|---|
| VOLTAGE [¥] | 270 | 278 | ... |

BUS VOLTAGE AFTER CONTROL

| BUS | BUS 1 | BUS 2 | ... |
|---|---|---|---|
| VOLTAGE [¥] | 275 | 276 | ... |

STATE OF CONTROL DEVICE BEFORE CONTROL

| | CONTROL PATTERN | | INITIAL STATE |
|---|---|---|---|
| | | NAME | TURN-ON/TURN-OFF |
| DEVICE TO BE CONTROLLED | PHASE ADJUSTMENT FACILITY | POWER CAPACITOR 1 | TURN-OFF |
| | | SHUNT REACTOR 2 | TURN-OFF |
| | | ... | ... |
| | | NAME | TAPPING POSITION |
| | TRANSFORMER WITH LTC | TRANSFORMER 3 | 1 |
| | | ... | ... |
| | ... | ... | ... |

STATE OF CONTROL DEVICE AFTER CONTROL

| | CONTROL PATTERN | | CONTROL PATTERN 3 |
|---|---|---|---|
| | | NAME | TURN-ON/TURN-OFF |
| DEVICE TO BE CONTROLLED | PHASE ADJUSTMENT FACILITY | POWER CAPACITOR 1 | TURN-ON |
| | | SHUNT REACTOR 2 | TURN-OFF |
| | | ... | ... |
| | | NAME | TAPPING POSITION |
| | TRANSFORMER WITH LTC | TRANSFORMER 3 | 2 |
| | | ... | ... |
| | ... | ... | ... |

PREDICTED COST VALUE WITHOUT CONTROL

| TOTAL CONTROL COST [¥] | ●● |
|---|---|
| PREDICTED TOTAL LOSS [¥] (FOR ONE MINUTE) | ○○ |

PREDICTED COST VALUE AFTER CONTROL

| TOTAL CONTROL COST [¥] | ▶▶ |
|---|---|
| PREDICTED TOTAL LOSS [¥] (FOR ONE MINUTE) | ◇◇ |

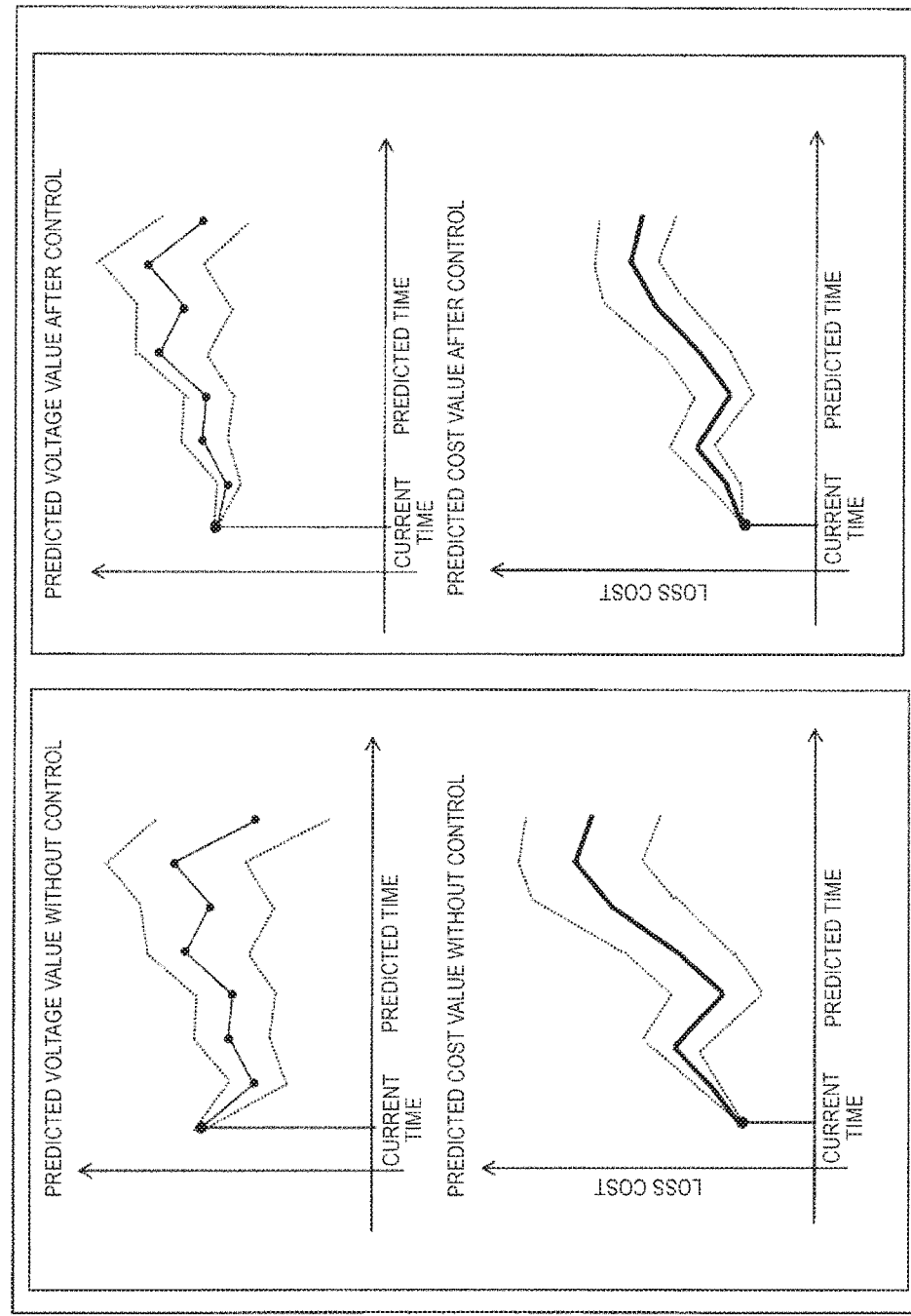
[Fig. 20]

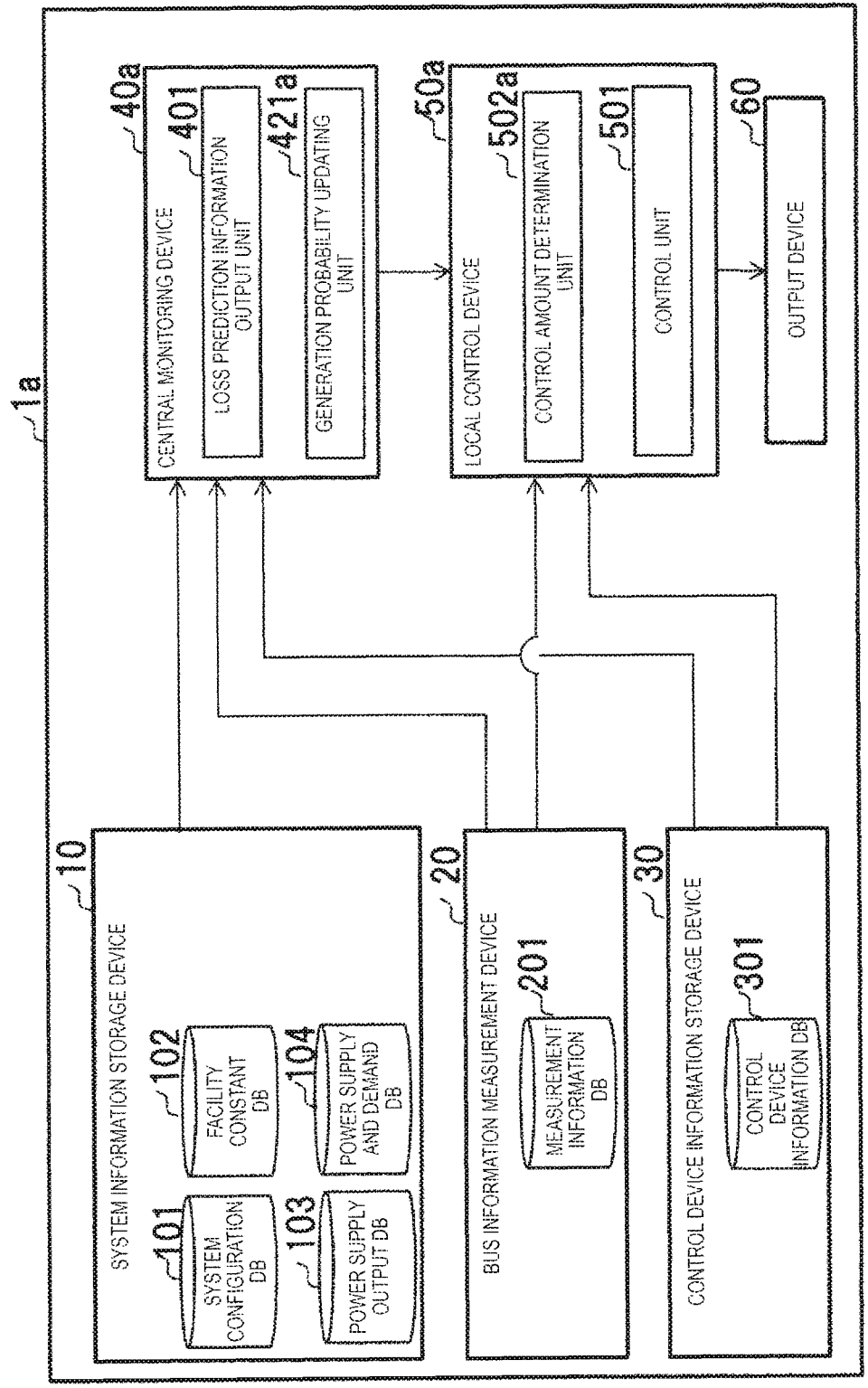

[Fig. 22]
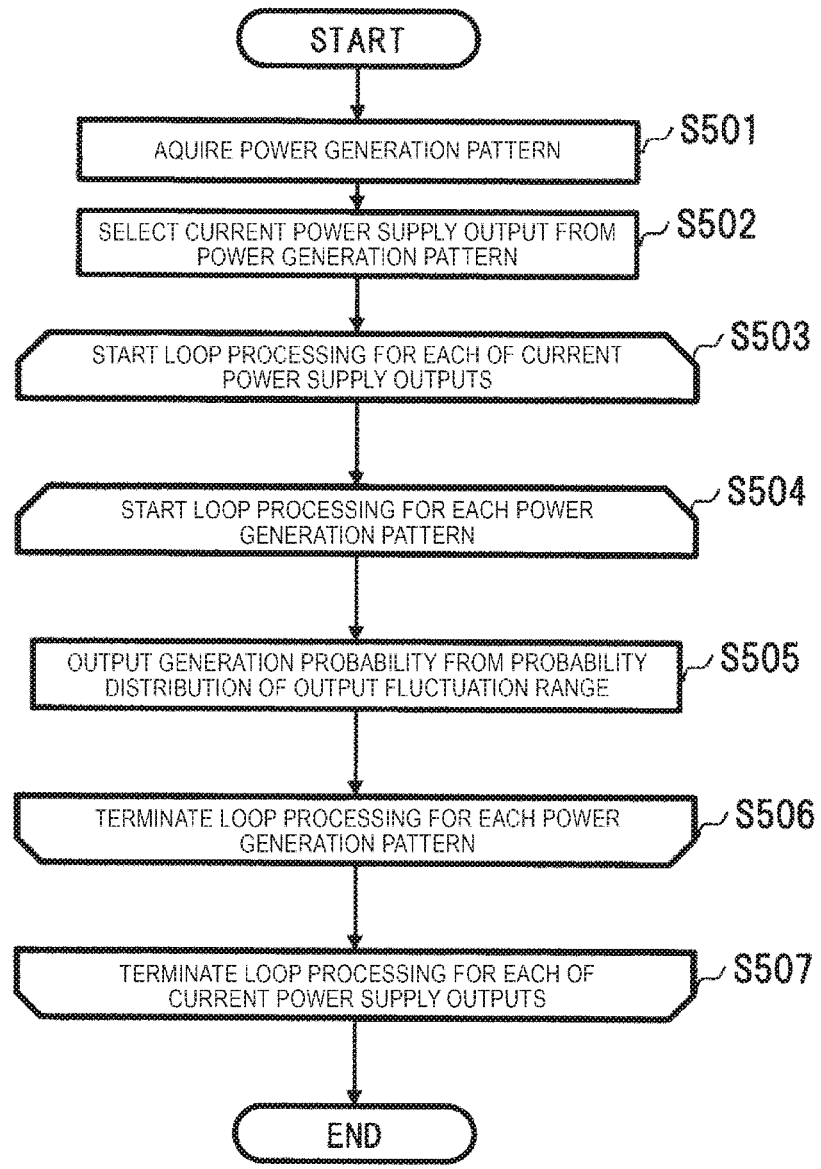

[Fig. 23]

| CURRENT POWER SUPPLY OUTPUT | | | POWER GENERATION PATTERN 1 | | ... | POWER GENERATION PATTERN 2 | | ... |
|---|---|---|---|---|---|---|---|---|
| POWER GENERATION PATTERN AFTER FLUCTUATION | | | POWER GENERATION PATTERN 1 | POWER GENERATION PATTERN 2 | ... | ... | ... | ... |
| GENERATION PROBABILITY | PREDICTED TIME STEP | AFTER 10 SECONDS | 0.7% | 0.9% | ... | ... | ... | ... |
| | | ... | ... | ... | ... | ... | ... | ... |

[Fig. 24]
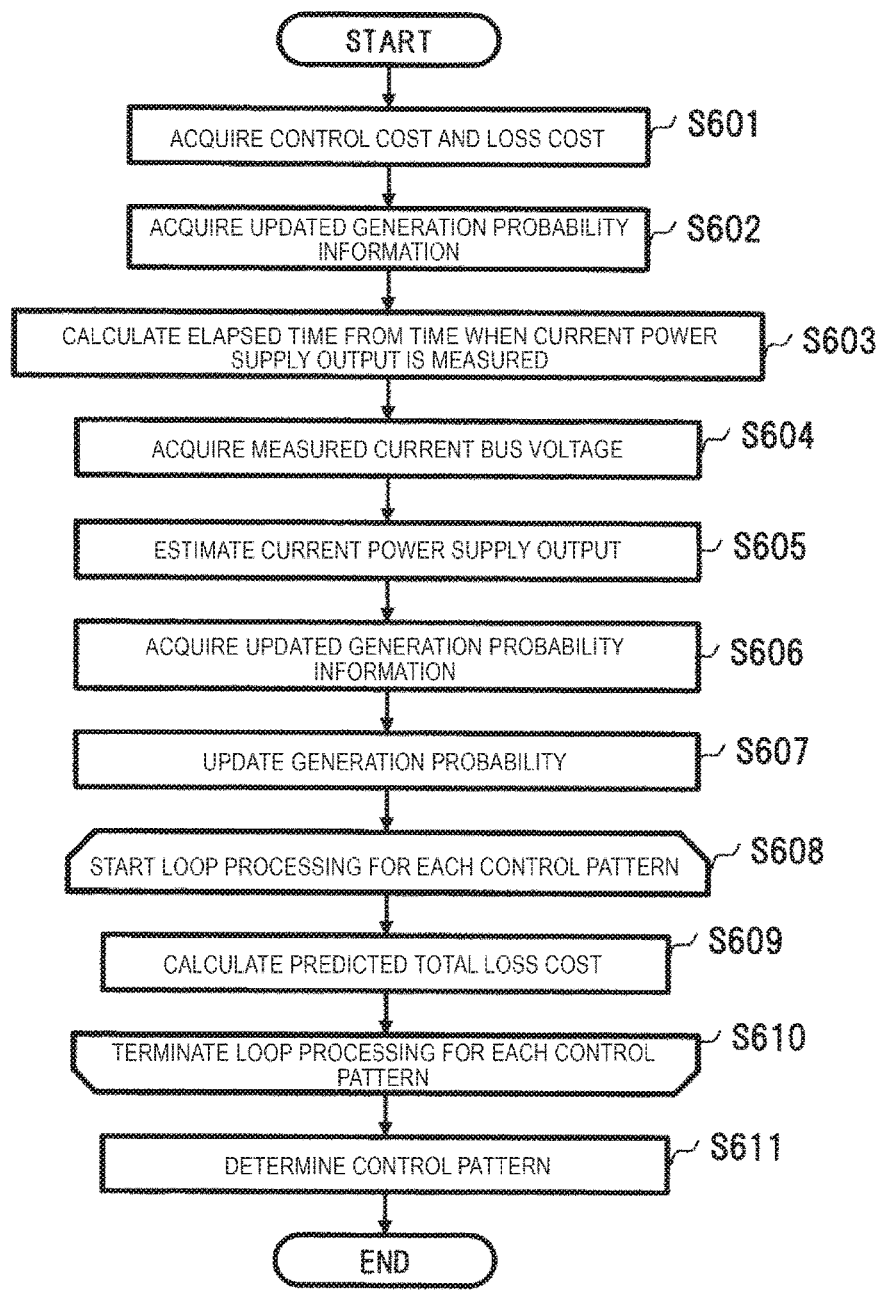

[Fig. 25]

| ELAPSED TIME | 10 SECONDS | | | | | | |
|---|---|---|---|---|---|---|---|
| CURRENT POWER FLOW | BUS | BUS 1 | | BUS 2 | | ... | |
| | VOLTAGE [kV] | 274 | | 278 | | ... | |
| ESTIMATION OF CURRENT STATE OF POWER SUPPLY | POWER GENERATION PATTERN | POWER GENERATION PATTERN 1 | | | | POWER GENERATION PATTERN 2 | |
| | GENERATION PROBABILITY | 1.2% | | | | 2.0% | |
| POWER GENERATION PATTERN AFTER FLUCTUATION | | POWER GENERATION PATTERN 1 | POWER GENERATION PATTERN 2 | ... | ... | ... | ... |
| GENERATION PROBABILITY | PREDICTED TIME STEP | | | | | | |
| | AFTER 10 SECONDS | 0.7% | 0.9% | ... | ... | ... | ... |
| | ... | ... | ... | | | | |

[Fig. 26]

| | | | POWER GENERATION PATTERN | POWER GENERATION PATTERN 1 | POWER GENERATION PATTERN 2 | ... |
|---|---|---|---|---|---|---|
| PREDICTED TIME STEP | AFTER 10 SECONDS | | GENERATION PROBABILITY | 0.9% | 0.7% | ... |
| | | LOSS COST | WITHOUT CONTROL | ○○ | ... | ... |
| | | | CONTROL PATTERN 1 | △△ | ... | ... |
| | | | ... | ... | ... | ... |
| | AFTER 20 SECONDS | | GENERATION PROBABILITY | ... | ... | ... |
| | | LOSS COST | WITHOUT CONTROL | ... | ... | ... |
| | | | CONTROL PATTERN 1 | ... | ... | ... |
| | | | ... | ... | ... | ... |
| | ... | ... | ... | ... | ... | ... |

VOLTAGE AND REACTIVE POWER CONTROL SYSTEM

TECHNICAL FIELD

The present invention relates to a voltage and reactive power control system, which is referred to below as a voltage reactive power control system.

BACKGROUND ART

The background art of the technical field includes JP-A-2013-005621 (PTL 1). This publication discloses that "in a voltage reactive power control system maintaining a bus voltage of a loop system, configured to supply power with power transmission lines formed in a loop shape through a plurality of power generation and transformer substations, in an appropriate range, the amount of reactive power in a case where phase adjustment facilities of the loop system are separately installed and opened is calculated when the bus voltage exceeds a target set voltage range, a simulation is made to confirm whether a reduction in transmission loss can be achieved and whether the bus voltage falls within the target set voltage range, on the basis of the amount of reactive power, and the phase adjustment facilities are controlled so that a setting state for performing the simulation is set in a case where it is determined that a reduction in transmission loss can be achieved and that the bus voltage falls within the target set voltage range." (see Abstract).

CITATION LIST

Patent Literature

PTL 1: JP-A-2013-005621

SUMMARY OF INVENTION

Technical Problem

PTL 1 discloses the voltage reactive power control system that performs control of setting a setting state for performing a simulation in a case where it is determined that a reduction in transmission loss is achieved by simulating the range of the bus voltage and that the bus voltage falls within the target set voltage range. However, a frequent fluctuation in bus voltage is not considered. This case is, for example, a case where the bus voltage immediately returns within the target set voltage range after getting out of the target set voltage range. Since it is assumed that the bus voltage is large and frequently fluctuates due to an increase in a naturally fluctuating power supply and diversification in the arrangement of a power supply, the number of unnecessary operations of a device may be increased in the voltage reactive power control system that sequentially determines a target set voltage and decides the amount of control. In addition, at a time when the determination is performed, a transmission loss may be increased at the next time due to a sudden fluctuation in the bus voltage even in a case of the amount of control in which a transmission loss is reduced. For this reason, control of increasing a transmission loss may be performed for a fixed period of time.

Consequently, an object of the invention is to economically operate a voltage reactive power control device by reducing a transmission loss and reducing the number of tapping operations affecting the life span of a facility.

Solution to Problem

According to the invention, there is provided a voltage reactive power control device including a central monitoring device (40) that includes a loss prediction information output unit (401) calculating a bus voltage on the basis of a generation probability of a power generation pattern, and outputting loss prediction information associated with the bus voltage from system configuration information, and includes a control amount determination unit (411) determining a control pattern of the voltage reactive power control device from the loss prediction information.

Advantageous Effects of Invention

According to the invention, it is possible to economically operate a voltage reactive power control device by reducing a transmission loss and reducing the number of tapping operations affecting the life span of a facility.

BRIEF DESCRIPTION OF DRAWINGS

FIG. 1 is a configuration diagram illustrating a voltage reactive power control system according to an embodiment of the invention.

FIG. 2 is a diagram illustrating data stored in a power supply output database (DB) 103 according to the embodiment of the invention.

FIG. 3 is a diagram illustrating a probability distribution of an output fluctuation range stored in the power supply output DB 103 according to the embodiment of the invention.

FIG. 4 is a diagram illustrating data stored in a power supply and demand DB 104 according to the embodiment of the invention.

FIG. 5 is a diagram illustrating data stored in a measurement information DB 201 according to the embodiment of the invention.

FIG. 6 is a diagram illustrating data stored in the measurement information DB 201 according to the embodiment of the invention.

FIG. 7 is a diagram illustrating data stored in a control device information DB 301 according to the embodiment of the invention.

FIG. 8 is a diagram illustrating data stored in a loss prediction information output unit 401 according to the embodiment of the invention.

FIG. 9 is a flow chart illustrating processing data of a power generation pattern calculation unit 402 according to the embodiment of the invention.

FIG. 10 is a diagram illustrating processing of the power generation pattern calculation unit 402 according to the embodiment of the invention.

FIG. 11 is a flow chart illustrating processing data of a voltage prediction information calculation unit 403 according to the embodiment of the invention.

FIG. 12 is a diagram illustrating processing of the voltage prediction information calculation unit 403 according to the embodiment of the invention.

FIG. 13 is a flow chart illustrating processing data of a loss prediction information calculation unit 404 according to the embodiment of the invention.

FIG. 14 is a diagram illustrating processing of the loss prediction information calculation unit 404 according to the embodiment of the invention.

FIG. 15 is a diagram illustrating processing of the loss prediction information calculation unit 404 according to the embodiment of the invention.

FIG. 16 is a diagram illustrating processing of the loss prediction information calculation unit 404 according to the embodiment of the invention.

FIG. 17 is a flow chart illustrating processing data of a control amount determination unit 411 according to the embodiment of the invention.

FIG. 18 is a diagram illustrating processing of the control amount determination unit 411 according to the embodiment of the invention.

FIG. 19 is a diagram illustrating screen display data according to the embodiment of the invention.

FIG. 20 is a diagram illustrating screen display data according to the embodiment of the invention.

FIG. 21 is a configuration diagram illustrating a voltage reactive power control system according to another embodiment of the invention.

FIG. 22 is a flow chart illustrating processing of a generation probability updating unit 421a according to the embodiment of the invention.

FIG. 23 is a diagram illustrating processing of the generation probability updating unit 421a according to the embodiment of the invention.

FIG. 24 is a flow chart illustrating processing of a control amount determination unit 502a according to the embodiment of the invention.

FIG. 25 is a diagram illustrating processing of the control amount determination unit 502a according to the embodiment of the invention.

FIG. 26 is a diagram illustrating processing of a loss prediction information calculation unit 404 according to the embodiment of the invention.

DESCRIPTION OF EMBODIMENTS

Hereinafter, embodiments will be described with reference to the accompanying drawings.

First Embodiment

In the present embodiment, a description will be given of an example of a voltage reactive power control system 1 that economically operates a voltage reactive power control device by reducing a transmission loss and reducing the number of tapping operations affecting the life span of a facility.

FIG. 1 is an example of a configuration diagram of the voltage reactive power control system according to this embodiment.

The voltage reactive power control system 1 includes a system information storage device 10, a bus information measurement device 20, a control device information storage device 30, a central monitoring device 40, a local control device 50, and an output device 60.

The system information storage device 10 includes a system configuration DB 101, a facility constant DB 102, a power supply output DB 103, and a power supply and demand DB 104.

The system configuration DB 101 stores, for example, a generator, a load, the position of a transformer substation, and the state of connection to a power transmission line.

The facility constant DB 102 stores parameters of the facilities stored in the system configuration DB 101. The facility constant DB 102 stores, for example, information regarding the impedance and admittance of a power transmission line and the reactance of a transformer substation. In addition, the facility constant DB 102 stores upper and lower limits of effective power and reactive power which are capable of being supplied by a power plant. The facility constant DB 102 stores an output adjustment speed with respect to a power plant capable of adjusting an output.

FIG. 2 is an example of data stored in the power supply output DB 103. The power supply output DB 103 stores the type, name, position, and capacity of a power supply in association with each other. In addition, the power supply output DB 103 stores the fluctuation probability of power supply output in association with the power supply output. The power supply output DB 103 stores the probability of an output fluctuation range which is predicted in one or a plurality of time steps. A probability distribution of a fluctuation range of the power supply output is determined depending on, for example, changes in wind conditions in a wind power plant, changes in the amount of solar radiation in a solar power plant, and changes in the amount of demand in a thermoelectric power plant for supply and demand adjustment.

FIG. 3 is an example of a probability distribution of an output fluctuation range which is stored in the power supply output DB 103. In FIG. 3, an output fluctuation range and a probability are plotted with respect to a certain power supply output and a certain time step. The probability may be estimated from output fluctuation data stored, using a power supply output at the current point in time as a key, or may be calculated from wind conditions, the prediction of the amount of solar radiation, and the prediction of demand. In addition, a plurality of probability distributions may be stored depending on periods and seasons, or may be used for different purposes.

FIG. 4 is an example of data stored in the power supply and demand DB 104. The power supply and demand DB 104 acquires a power supply output for each generator and stores the acquired power supply outputs. The power supply and demand DB 104 acquires a power demand for each demand area and stores the acquired power demands. In FIG. 4, the amount of effective power is described with respect to a power supply output and a power supply and demand, but the power supply and demand DB 104 may measure and store reactive power.

The bus information measurement device 20 includes a measurement information DB 201.

FIG. 5 is an example of data stored in the measurement information DB 201. The measurement information DB 201 stores a name and position of a measurement portion, a reference voltage, and a name of a local control device that controls a measured bus voltage in association with each other. In addition, the measurement information DB 201 stores a measured bus voltage in association with measurement time. The bus voltage may be intermittently measured or may be measured at fixed time intervals.

FIG. 6 is an example of data stored in the measurement information DB 201. The measurement information DB 201 stores the state of a device controlled by a local control device in association with a name of each device. The wording "state of a device" refers to turn-on/turn-off indicating a connection state in a phase adjustment facility such as a power capacitor or a shunt reactor. In addition, the wording refers to the position of tapping in, for example, a transformer with a load tap changer (LTC).

The control device information storage device 30 includes a control device information DB 301.

FIG. 7 is an example of data stored in the control device information DB 301. The control device information DB 301 stores a name of a local control device in association with information regarding a control device of the local control device. Regarding the information regarding the control device, for example, in a phase adjustment facility, a name, a capacity, and a control cost are stored in association with each other. In a transformer with an LTC, for example, a primary-side reference voltage, a secondary-side reference voltage, tapping points, a transformation ratio corresponding to each tapping position, and a control cost in association with a name of a device are stored. The control cost may be, for example, the sum of an operation cost of a device, which is required to control tapping and to supply reactive power, and a deterioration loss of the device, occurring due to control, which is converted into a cost, or may be either the operation cost or the deterioration loss of the device. The deterioration loss of the device is calculated from, for example, an introduction cost and maintenance cost of the device, and the number of times of control up to the life span thereof.

The central monitoring device 40 includes a loss prediction information output unit 401 and a control amount determination unit 411.

FIG. 8 is an example of a configuration diagram of the loss prediction information output unit 401. The loss prediction information output unit 401 includes a power generation pattern calculation unit 402, a voltage prediction information calculation unit 403, and a loss prediction information calculation unit 404.

FIG. 9 is a flow chart illustrating processing of the power generation pattern calculation unit 402. Hereinafter, the processing of FIG. 9 will be described while appropriately referring to processing data of the power generation pattern calculation unit 402 illustrated in FIG. 10.

In S101, a system configuration and a facility constant are acquired from the system configuration DB 101 and the facility constant DB 102.

In S102, the power generation pattern calculation unit 402 acquires the current power supply output and power demand in each generator and demand area from the power supply and demand DB 104. The power generation pattern calculation unit 402 stores a name of a demand area and a power demand of each demand area in a row of "demand area" and a row of "power demand" of FIG. 10, respectively. The power generation pattern calculation unit 402 stores a name of a power supply and a power demand of each power supply in a row of "power plant" and a row of "power supply output" of FIG. 10, respectively.

In S103, the power generation pattern calculation unit 402 acquires a probability distribution of an output fluctuation range from the power supply output DB 103 using the current power supply output acquired in S103 as a key. The power generation pattern calculation unit 402 may acquire a probability distribution of an output fluctuation range of a power supply which is created for each period, date, or time from the power supply output DB 103 using the current period, date, or time as a key. The power generation pattern calculation unit 402 may acquire a probability distribution of an output fluctuation range of a power supply which is created for each power demand, using the current power demand acquired in S103 as a key.

In S104 to S109, the power generation pattern calculation unit 402 performs loop processing for each combination of the output fluctuation ranges of the respective power supplies which are acquired in S103.

In S105, the power generation pattern calculation unit 402 selects one combination from combinations of output fluctuation ranges of respective power supplies, and determines an output fluctuation range of each power supply. Meanwhile, the output fluctuation range of each power supply is changed for each loop processing, and is determined so that the same combination is not selected. A predicted value of a power supply output is calculated from an output fluctuation range and the current power supply output acquired in S102.

In S106, the power generation pattern calculation unit 402 determines an output of a power supply capable of adjusting an output on the basis of the output of each power supply which is calculated in S105 and the current amount of demand acquired in S102. The power generation pattern calculation unit 402 determines a distribution and amount of output on the basis of the upper and lower limits of an output adjustment speed, effective power, and reactive power which are acquired in S101 at the time of determining the output of a power supply capable of adjusting an output. Regarding the output of a power supply capable of adjusting an output, an output is determined so as to maintain a balance of supply and demand in, for example, a gas thermoelectric power plant or a hydroelectric power plant.

In S107, the power generation pattern calculation unit 402 allocates a pattern number for each power supply output pattern of each loop. The power generation pattern calculation unit 402 stores a pattern number in a row of "power generation pattern" of FIG. 10. The power generation pattern calculation unit 402 stores the name of a power plant which is acquired in S101 in a row of "power plant" of FIG. 10, and stores the predicted value of a power supply output which is calculated in S105 and the output of a power supply capable of adjusting an output which is determined in S106 in a row of "power supply output" in association with a name of the corresponding power plant.

In S108, the power generation pattern calculation unit 402 acquires a generation probability for each power supply from the power generation output DB 103 using the current power supply output and an output fluctuation range of each power supply for each power generation pattern as a key. A generation probability of the power generation pattern is output by multiplying probabilities of all power supplies associated with the power generation pattern by each other. The power generation pattern calculation unit 402 stores a generation probability corresponding to a predicted time step in a row of "generation probability" of FIG. 10.

FIG. 11 is a flow chart illustrating processing of the voltage prediction information calculation unit 403. Hereinafter, the processing of FIG. 11 will be described while appropriately referring to processing data of the voltage prediction information calculation unit 403 illustrated in FIG. 12.

In S201, the voltage prediction information calculation unit 403 acquires a system configuration and a facility constant from the system configuration DB 101 and the facility constant DB 102.

In S202, the voltage prediction information calculation unit 403 acquires a bus voltage from the measurement information DB 201 in association with a name of a measurement portion. The voltage prediction information calculation unit 403 may calculate data in a time slot, which is not capable of being measured by the measurement information DB 201, from a power supply output and the amount of demand to thereby interpolate the data. In addition, the voltage prediction information calculation unit 403 acquires the state of a control device from the measurement information DB 201 in association with a name. The voltage prediction information calculation unit 403 stores the name of the measurement portion which is acquired from the measurement information DB 201 and a bus voltage associated with the name, in a row of "current power flow" of FIG. 12.

In S203, the voltage prediction information calculation unit 403 acquires the current power supply output and power demand in each generator and demand area from the power supply and demand DB 104.

In S204, the voltage prediction information calculation unit 403 acquires a generation probability associated with a pattern number of a power generation pattern from the power generation pattern calculation unit 402. The voltage prediction information calculation unit 403 stores a power generation pattern number in a row of "power generation pattern" of FIG. 12. The voltage prediction information calculation unit 403 stores a generation probability corresponding to a predicted time step in a row of "generation probability" of FIG. 12.

In S205 to S208, the voltage prediction information calculation unit 403 performs loop processing for each power generation pattern acquired in S203.

In S206, the voltage prediction information calculation unit 403 acquires each power supply output from the power generation pattern calculation unit 402 using the power generation pattern number as a key. The voltage prediction information calculation unit 403 performs power flow calculation using the power demand and power supply outputs acquired in S203, the system configuration and facility constant acquired in S201, and the state of the control device which is acquired in S202 as inputs.

In S207, the voltage prediction information calculation unit 403 outputs bus voltages in results of the power flow calculation performed in S206. The voltage prediction information calculation unit 403 stores the bus voltages in a row of "predicted power flow" of FIG. 12.

FIG. 13 is a flow chart illustrating processing of the loss prediction information calculation unit 404. Hereinafter, the processing of FIG. 13 will be described while appropriately referring to processing data of the loss prediction information calculation unit 404 illustrated in FIGS. 14, 15, and 16.

In S301, the loss prediction information calculation unit 404 acquires information regarding a system configuration and a control device from the control device information DB 301. For example, the information includes a name and a capacity in a phase adjustment facility, and includes a primary-side reference voltage, a secondary-side reference voltage, tapping points, a transformation ratio corresponding to each tapping position in a transformer with an LTC. The loss prediction information calculation unit 404 stores acquired names of devices in a row "device to be controlled" and a column of "name" of FIG. 14.

In S302, the loss prediction information calculation unit 404 creates a control pattern on the basis of the information regarding the control device which is acquired in S301, and gives and outputs a pattern number. The loss prediction information calculation unit 404 determines the control pattern by a combination of states of the control device. The combination of states of the control device is, for example, an ON/OFF state in the phase adjustment facility, and is a combination of tapping positions in the transformer with an LTC. The loss prediction information calculation unit 404 stores a control pattern number in a row of "control pattern" of FIG. 14. The loss prediction information calculation unit 404 stores the state of a control device in the row of "device to be controlled" of FIG. 14 for each of columns of the respective control pattern numbers. The loss prediction information calculation unit 404 acquires a control cost of each device from the control device information DB 301 using the state of control as a key, and calculates a total value for each control pattern. The loss prediction information calculation unit 404 stores the total value of control costs in a row of "total control cost" of FIG. 14 for each control pattern.

In S303, the loss prediction information calculation unit 404 acquires a bus voltage from the measurement information DB 201 in association with a name of a measurement portion. The loss prediction information calculation unit 404 acquires the current state of a control device from the measurement information DB 201 in association with a name. The loss prediction information calculation unit 404 stores the current state of a control device in the row of "device to be controlled" and a column of "initial state" of FIG. 14. In addition, a control cost of each device is acquired from the control device information DB 301 using the current control state as a key, and a control cost required to maintain the current state of a control device is calculated. The loss prediction information calculation unit 404 stores a control cost required to maintain the current state of a control device in the row of "total control cost" and the column of "initial state" of FIG. 14.

In S304, the loss prediction information calculation unit 404 acquires the current power supply output and power demand in each generator and demand area from the power supply and demand DB 104.

In S305, the loss prediction information calculation unit 404 acquires a generation probability associated with a pattern number of a power generation pattern from the power generation pattern calculation unit 402. The loss prediction information calculation unit 404 stores a power generation pattern number in a row of "power generation pattern" of FIG. 16. The voltage prediction information calculation unit 403 stores a generation probability corresponding to each predicted time step of a row of "predicted step" of FIG. 16 in a row of "generation probability".

In S306 to S311, the loss prediction information calculation unit 404 performs loop processing for each power generation pattern acquired in S305.

In S307 to S310, the loss prediction information calculation unit 404 performs loop processing for each control pattern determined in S302.

In S308, the loss prediction information calculation unit 404 acquires each power supply output from the power generation pattern calculation unit 402 using a power generation pattern number as a key. The loss prediction information calculation unit 404 acquires the state of each control device from S302 using a control pattern number as a key. The loss prediction information calculation unit 404 performs power flow calculation using the power demand and power supply outputs acquired in S304, the system configuration and facility constant acquired in S301, and the state of the control device which is acquired in S302 as inputs. The loss prediction information calculation unit 404 acquires the row of "predicted power flow" of FIG. 12 from the voltage prediction information calculation unit 403, and stores in "predicted power flow (without control)" of FIG. 15. The loss prediction information calculation unit 404 stores a control pattern number during loop processing in a row of "control pattern" of FIG. 15. The loss prediction information calculation unit 404 stores a voltage calculated by the power flow calculation in the row of "control pattern" of FIG. 15 in association with each bus. The loss prediction information calculation unit 404 acquires the current bus voltage from S303, calculates a voltage fluctuation from a difference from the calculated voltage, and stores the calculated voltage fluctuation in the row of "control pattern" and a row of "voltage fluctuation".

In S309, the loss prediction information calculation unit 404 calculates a loss cost (loss prediction information) on the basis of a result of the power flow calculation performed in S308. The loss cost is, for example, a loss cost due to a power transmission loss or a loss cost due to an abnormal rise or drop in voltage. The loss cost due to a power transmission loss may be calculated from the result of the power flow calculation, may be converted into a cost from an average fuel cost of generators, and may be calculated from electricity rates. The loss cost due to an abnormal rise or drop in voltage is, for example, a loss cost due to a problem of voltage stability, a loss cost of device breakdown due to the excess of a voltage allowable limit of a device, and a loss cost due to a deterioration of voltage quality. Regarding the loss cost due to a problem of voltage stability, costs required for the output adjustment and sudden stop of a power supply, demand suppression, and load shutdown are calculated as countermeasure costs for suppressing voltage collapse. The loss prediction information calculation unit 404 stores the calculated loss costs (loss prediction information) in rows of "predicted power flow (without control)" and "loss cost" and rows of "control pattern" and "loss cost" of FIG. 15. The loss prediction information calculation unit 404 stores the power generation pattern acquired in S305 and the generation probability for each predicted time step in rows of "predicted time step" and "generation probability" of FIG. 16. The loss prediction information calculation unit 404 stores the calculated loss costs in rows of "predicted time step" and "loss cost" for each power generation pattern, predicted time step, and control pattern.

FIG. 17 is a flow chart illustrating processing of the control amount determination unit 411. Hereinafter, the processing of FIG. 17 will be described while appropriately referring to processing data of the control amount determination unit 411 illustrated in FIG. 18.

In S401, the control amount determination unit 411 acquires information described in FIG. 16 and control costs of the voltage reactive power control device which is stored in the control device information DB 301 from the loss prediction information calculation unit 404.

In S402 to S405, the control amount determination unit 411 performs loop processing for each control pattern acquired in S401.

In S403, the control amount determination unit 411 multiplies the predicted time step acquired in S401 by a generation probability and loss cost for each power generation pattern, and performs adding-up in all of the power generation patterns. The calculated values are set as expected loss costs, and the expected loss costs are summed up by a preset predicted time step to be output as a predicted total loss. The preset predicted time step may be determined by a user's input, or may be determined depending on a control period and response period of a local control device, or a communication period of the central monitoring device 40. The control amount determination unit 411 stores a control pattern number during loop processing in a row of "control pattern" of FIG. 18. The control amount determination unit 411 stores the predicted total loss in a row of "predicted total loss" of FIG. 18. In the example of FIG. 18, a specified value of predicted time steps to be added up is set to one minute. This indicates that a total value of predicted losses for one minute from the present state is calculated.

In S405, the control amount determination unit 411 selects and outputs a control pattern in which the sum of a total control cost and a predicted total loss in FIG. 18 is minimized.

The local control device 50 includes a control unit 501.

The control unit 501 acquires a control pattern from the control amount determination unit 411 and controls a device in accordance with the control pattern.

FIG. 19 is an example of an output of the output device 60. The output device 60 acquires a name of a local control device from the control device information DB 301, and outputs the acquired name in "name of local control device" of FIG. 19. The output device 60 acquires a time when the local control device performs control from the local control device 50, and writes the acquired time in a section of "control time" of FIG. 19. The output device 60 acquires bus voltages before and after the control of the local control device from the measurement information DB 201, and outputs the acquired bus voltages in sections of "bus voltage before control" and "bus voltage after control" of FIG. 19. The output device 60 acquires the state of a control device before control from the loss prediction information calculation unit 404, and outputs the acquired state in a section of "state of control device before control" of FIG. 19. The output device 60 acquires a control pattern from the control amount determination unit 411, and acquires the state of a control device from the loss prediction information calculation unit 404 using the acquired control pattern as a key. The output device 60 outputs the state of the control device in a section of "state of control device after control" of FIG. 19. The output device 60 acquires a total control cost without control and a predicted total loss from the control amount determination unit 411, and writes the acquired total control cost and predicted total loss in a section of "predicted cost value without control" of FIG. 19. The output device 60 acquires a total control cost of a control pattern and a predicted total loss from the control amount determination unit 411, and writes the acquired total control cost and predicted total loss in a section of "predicted cost value after control" of FIG. 19.

A control cost and a loss cost are predicted at a preset predicted time, and the amount of control is determined, and thus it is possible to economically operate a device even with frequent voltage fluctuations. Effects of control can be evaluated by outputting a predicted cost value without control and a predicted cost value after control, and thus it is possible to examine a more economical control.

FIG. 20 is an example of an output of the output device 60. The output device 60 acquires predicted voltage values without control and after control and the generation probabilities thereof from the loss prediction information calculation unit 404 for each predicted time step, and plots the acquired predicted voltage values and generation probabilities. The output device 60 acquires loss costs without control and after control and the generation probabilities thereof from the loss prediction information calculation unit 404 for each predicted time step, and plots the acquired loss costs and generation probabilities. A solid line in FIG. 20 indicates an expected value of a loss cost, and dotted lines indicate upper and lower limits in a section of 90%.

A probability distribution of a predicted voltage value is output, and thus it is possible to evaluate the frequency and magnitude of a voltage fluctuation and to use the evaluated frequency and magnitude for the evaluation of a high risk of power cut such as voltage collapse. In addition, it is possible to evaluate effects of the voltage reactive power control device under a power cut risk by the output of a predicted voltage value after control.

A probability distribution of a loss cost is output, and thus it is possible to valuate a time slot and cause of a loss. In addition, the reduced sum of the loss can be evaluated, and thus can be used for the examination of facility investment. In addition, it is possible to economically operate the voltage reactive power control device by reducing a transmission loss and reducing the number of tapping operations affecting the life span of a facility.

Meanwhile, the invention is not limited to the above-described embodiment, and includes various modification examples. For example, the above-described embodiment has been described in detail in order to facilitate the understanding of the invention, and is not necessarily limited to including all of the above-mentioned configurations.

Second Embodiment

In this embodiment, a description will be given of an example of a voltage reactive power control system 1a that economically operates a voltage reactive power control device by predicting a voltage and a loss with a high level of accuracy by a local control device updating predicted information on the basis of measurement data, rather than a case where a target amount of control is directly output to a voltage reactive power control device.

Meanwhile, in the second embodiment and the subsequent embodiments, components described in the above-described embodiment will be denoted by the same reference numerals and signs, and a description thereof will be omitted.

FIG. 21 is an example of a configuration diagram of a voltage reactive power control system according to the second embodiment. The voltage reactive power control system 1a is different from the voltage reactive power control system 1 described in the first embodiment in that a central monitoring device 40a does not include a control amount determination unit 411 and includes a generation probability updating unit 421a and a local control device 50a includes a control amount determination unit 502a.

FIG. 22 is a flow chart illustrating processing of the generation probability updating unit 421a. Hereinafter, the processing of FIG. 22 will be described while appropriately referring to processing data of the generation probability updating unit 421a illustrated in FIG. 23.

In S501, the generation probability updating unit 421a acquires a power generation pattern from a power generation pattern calculation unit 402.

In S502, the generation probability updating unit 421a regards the power generation pattern as the current power supply output. The generation probability updating unit 421a stores a power generation pattern number regarded as the current power supply output in a row of "current power supply output" of FIG. 23.

In S503 to S507, the generation probability updating unit 421a performs loop processing for each of current power supply outputs that are present by a total number of power generation patterns.

In S504 to S506, the generation probability updating unit 421a performs loop processing for each power generation pattern.

In S505, the generation probability updating unit 421a derives an output fluctuation range from an output of each power supply which is associated with the current power supply output and the power generation pattern number acquired in S501. The generation probability updating unit 421a acquires a generation probability for each power supply from a power generation output DB 103 using the current power supply output and an output fluctuation range as keys. Probabilities of all power supplies associated with the power generation pattern are multiplied by each other to thereby output a generation probability of the power generation pattern. The generation probability updating unit 421a stores a generation probability corresponding to a predicted time step and the current power supply output in a row of "generation probability" of FIG. 23.

FIG. 24 is a flow chart illustrating processing of the control amount determination unit 502a. Hereinafter, the processing of FIG. 24 will be described while appropriately referring to processing data of the control amount determination unit 502a.

In S601, the control amount determination unit 502a acquires information described in FIG. 16 from a loss prediction information calculation unit 404.

In S602, the control amount determination unit 502a acquires generation probability updating information described in FIG. 23 from the generation probability updating unit 421a.

In S603, the control amount determination unit 502a acquires a time when the current power supply output is measured, from a central monitoring device, and calculates an elapsed time from a difference between the current time and the acquired time. The control amount determination unit 502a stores the calculated elapsed time in a row of "elapsed time" of FIG. 25.

In S604, the control amount determination unit 502a acquires the current bus voltage from a measurement information DB 201. The control amount determination unit 502a acquires a bus voltage to be controlled by at least a local control device from the measurement information DB 201. The control amount determination unit 502a stores the bus voltage in a row of "current power flow" of FIG. 25.

In S605, the control amount determination unit 502a selects a predicted time step having a short elapsed time, and acquires a generation probability associated with a power generation pattern number from a voltage prediction information calculation unit 403 using the predicted time step and the current bus voltage as keys. The control amount determination unit 502a regards the acquired probability as a presence probability of the current power supply output state. The control amount determination unit 502a stores the acquired probability in a row of "current power supply state estimation" for each power generation pattern.

In S606, the control amount determination unit 502a acquires a power generation pattern after fluctuation and a generation probability for each predicted time step from the generation probability updating unit 421a using the power generation pattern described in "current power supply state estimation" of FIG. 25 as a key. The control amount determination unit 502a stores the acquired probability in a row of "generation probability" of FIG. 25.

In S607, the control amount determination unit 502a multiplies a generation probability in the row of "current power supply state estimation" of FIG. 25 by the generation probability of the power generation pattern after fluctuation to thereby update the generation probability of the power generation pattern after fluctuation. Derived probabilities that are common to a power generation pattern after fluctuation are added up, and are stored in a row of "predicted time step" of FIG. 26.

In S608 to S610, the control amount determination unit 502*a* performs loop processing for each control pattern acquired in S601.

In S609, the control amount determination unit 502*a* multiplies the predicted time step acquired in S601 by a generation probability and loss cost for each power generation pattern, and performs adding-up in all of the power generation patterns. The calculated values are set as expected loss costs, and the expected loss costs are summed up by a preset predicted time step to be output as a predicted total loss. The preset predicted time step may be determined by a user's input, or may be determined depending on a control period and response period of a local control device, or a communication period of the central monitoring device 40. The control amount determination unit 502*a* stores a control pattern number during loop processing in a row of "control pattern" of FIG. 18. The control amount determination unit 502*a* stores the predicted total loss in a row of "predicted total loss" of FIG. 18. In the example of FIG. 18, a specified value of predicted time steps to be added up is set to one minute. This indicates that a total value of predicted losses for one minute from the present state is calculated.

In S611, the control amount determination unit 502*a* selects and outputs a control pattern in which the sum of a total control cost and a predicted total loss in FIG. 18 is minimized.

Since a delay occurs in communication from a central control device, a local control device cannot necessarily acquire the latest information. For this reason, it is considered that predicted information from the central control device has a poor accuracy. In this embodiment, a local control device acquires information, such as a voltage and a loss, which is necessary for prediction, and loss prediction information can be updated on the basis of the latest information capable of being measured by the local control device, and thus the prediction can be performed more accurately. For this reason, it is possible to more economically operate a voltage reactive power control device.

REFERENCE SIGNS LIST

1: VOLTAGE REACTIVE POWER CONTROL DEVICE
10: SYSTEM INFORMATION STORAGE DEVICE
20: BUS INFORMATION MEASUREMENT DEVICE
30: CONTROL DEVICE INFORMATION STORAGE DEVICE
40: CENTRAL MONITORING DEVICE
50: LOCAL CONTROL DEVICE
60: OUTPUT DEVICE

The invention claimed is:

1. A voltage and reactive power control system that monitors a voltage and reactive power control device of a power system, the voltage and reactive power control system comprising:
 a system information storage device that stores information about the voltage and reactive power control system;
 a bus information measurement device that stores measurement information about a bus in the voltage and reactive power control system;
 a local control device configured to control a measured bus voltage;
 a control device information storage device that stores information about the local control device;
 an output device configured to output information related to the local control device;
 a central monitoring device that includes
  a loss prediction information output unit calculating a bus voltage based on a generation probability of a power generation pattern, and outputting loss prediction information associated with the bus voltage from system configuration information, and
  a control amount determination unit determining a control pattern of the voltage and reactive power control device from the loss prediction information;
 a power generation pattern calculation unit that outputs each power supply output and the generation probability thereof as the power generation pattern, using a probability distribution of an output fluctuation range of a power supply which is stored in a power supply output DB as an input; and
 a voltage prediction information calculation unit that predicts a voltage fluctuation of each bus, using the power generation pattern as an input;
 wherein the central monitoring device calculates loss prediction information from power flow calculation using the power generation pattern as an input, as time-series information in which at least any one of a power transmission loss cost, a loss cost due to breakdown of a power distribution facility, and costs required for output adjustment and sudden stop of a power supply, demand suppression, and load shutdown is associated with the generation probability, and calculates a control cost of the voltage and reactive power control device from power flow calculation using the power generation pattern as an input, as time-series information in which at least any one of an introduction cost and maintenance cost of the device and the number of times of control up to a life span thereof is associated with a generation probability.

2. The voltage and reactive power control system according to claim 1,
 wherein the control amount determination unit determines the control pattern which is a target amount of the voltage and reactive power control device, using a control cost of the voltage and reactive power control device which is stored in a control device information DB and the loss prediction information as inputs.

3. The voltage and reactive power control system according to claim 1,
 wherein the voltage and reactive power control system displays the control cost, a predicted value of the loss prediction information when a current state of a control device is maintained, and a predicted value based on a target amount of control which is output by the central monitoring device, from an output of the central monitoring device and control results of the local control device, and displays time-series information of the loss prediction information which is associated with the generation probability and voltage prediction information which is similarly associated with a generation probability.

4. The voltage and reactive power control system according to claim 1,
 wherein the voltage and reactive power control system includes
 a generation probability updating unit that outputs information for updating the loss prediction information associated with the bus voltage, and
 a control amount determination unit that updates the loss prediction information, using the measured bus voltage measured by the local control device and information from the generation probability updating unit as inputs.

* * * * *